Sept. 14, 1965    C. R. READING    3,206,157
FEED CONTROL VALVE
Filed Dec. 20, 1961
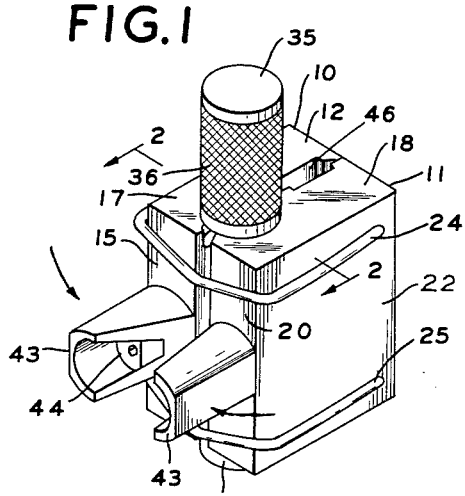
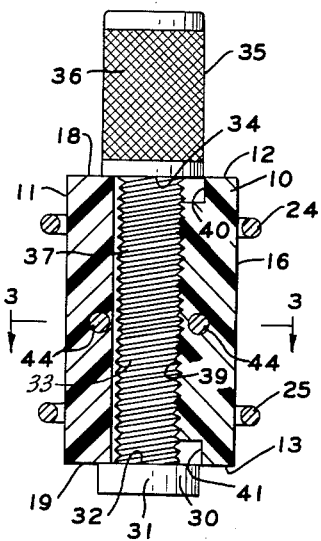
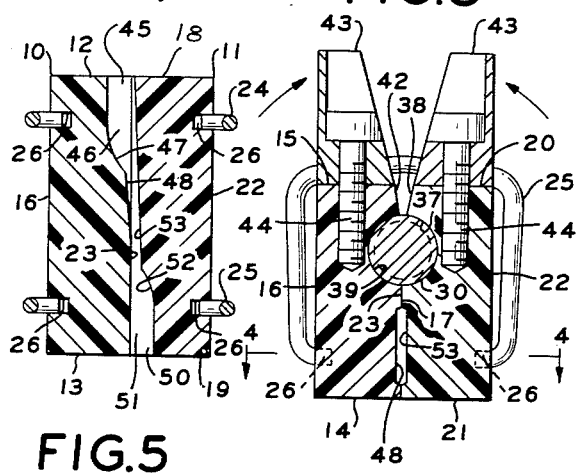
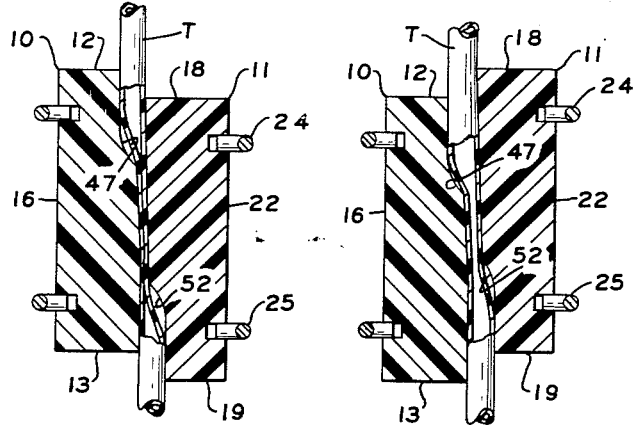
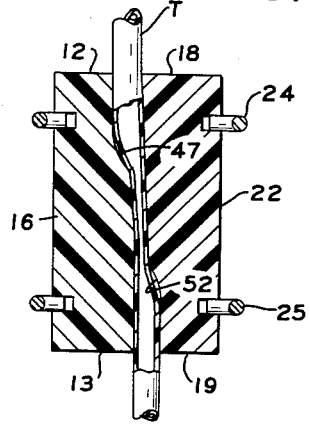
INVENTOR.
CHARLES R. READING
BY
ATTORNEY

United States Patent Office 3,206,157
Patented Sept. 14, 1965

3,206,157
FEED CONTROL VALVE
Charles R. Reading, Cedar Hill Road, Chalfont, Pa.
Filed Dec. 20, 1961, Ser. No. 160,825
10 Claims. (Cl. 251—9)

This invention relates to feed control valves and more particularly to such a valve for controlling very small flows of liquid.

In the dispensing of liquid materials for intravenous feeding and other therapeutic treatments considerable difficulty has been encountered in controlling the flow to the desired extent and particularly where the quantity to be fed is small and in a range from less than one drop per minute to eighteen or twenty drops per minute.

Various flow control devices have been proposed for use on or in connection with the tubing which connects the source to the injection needle but none of these has proven satisfactory because of inability to obtain close and accurate control or the inability to easily change the flow rate, or for other reasons.

It is the principal object of the present invention to provide a feed control valve for small flows which can be quickly and easily applied to the plastic tubing for delivery of the liquid to be controlled and which can be quickly and easily adjusted to provide the desired flow.

It is a further object of the present invention to provide a feed control valve which can be quickly and easily applied to plastic delivery tubes now available without introducing any problems of contamination of the liquid.

It is a further object of the present invention to provide a feed control valve for use with flexible plastic tubing which can be quickly and easily controlled using only one hand and with which a very close and accurate control of fluid delivery can be achieved.

It is a further object of the present invention to provide a flow control valve for use with flexible plastic tubing which is simple and sturdy in construction, yet reliable in operation.

Other objects and advantageous features of the invention will be apparent from the description and claims.

The nature and characteristic features of the invention will be more readily understood from the following description taken in connection with the accompanying drawings forming part thereof, in which;

FIGURE 1 is an enlarged view in perspective of a flow control valve in accordance with the invention prior to its application to the tubing with which it is used;

FIG. 2 is a vertical sectional view taken approximately on the line 2—2 of FIG. 1;

FIG. 3 is a horizontal sectional view taken approximately on the line 3—3 of FIG. 2;

FIG. 4 is a vertical sectional view taken approximately on the line 4—4 of FIG. 3 and showing one position of adjustment;

FIG. 5 is a view similar to FIG. 4 showing a different position of adjustment;

FIG. 6 is a view similar to FIGS. 4 and 5 showing a still different position of adjustment; and FIG. 7 is a view similar to FIG. 4 but with the tubing removed to show the shape of the interior passageway.

It should, of course, be understood that the description and drawings herein are illustrative merely, and that various modifications and changes can be made in the structure disclosed without departing from the spirit of the invention.

Like numerals refer to like parts throughout the several views.

Referring now more particularly to the drawings, in which a preferred embodiment of the feed control valve is illustrated in accordance with the invention, the preferred embodiment preferably includes a pair of body portions or blocks 10 and 11 of synthetic plastic material such as an acrylic resin.

The block 10 has parallel top and bottom bounding faces 12 and 13, parallel vertical front and rear faces 14 and 15, and outer and inner vertical faces 16 and 17.

The block 11 is similar to the block 10 and has parallel top and bottom bounding faces 18 and 19, parallel vertical front and rear faces 20 and 21 and outer and inner vertical faces 22 and 23.

The blocks 10 and 11 have resilient hinged and pivotal connectors provided by upper and lower U-shaped resilient bails 24 and 25 of wire which have ends 26 extending into openings 27 and through the outer face 16, in the body 10, for holding and pivotal movement, and extending around and spaced from the rear faces 15 and 21 with their opposite ends 26 extending into openings 27 in the body 11, and through the outer face 22.

The blocks 10 and 11 have an interposed fulcrum rod 30 which has a lower head 31, terminating at a shoulder 32, an intermediate threaded portion 33 terminating at a shoulder 34 and an upper stem 35 with a knurled surface 36 to facilitate grasping for turning with the fingers of the user.

One of the blocks 10 and 11, such as the block 11 has a semi-cylindrical opening 37 therethrough between the top and bottom faces 18 and 19 with a rear face portion 38 beveled or angularly disposed to permit pivotal movement of the block 11 about the fulcrum provided by the fulcrum rod 30 and limit the extent of such pivotal movement.

It will be noted that the shoulder 32 bears on the face 19 and the shoulder 34 bears on the face 18.

The other block, such as the block 10, has a semi-cylindrical opening 39 therethrough threaded for engagement by the threaded portion 33 with upper and lower counterbores 40 and 41 to provide clearance for the stem 35 and lower head 31, respectively. The block 10 has a rear face portion 42 beveled or angularly disposed to permit pivotal movement of the block 10 about the fulcrum provided by the fulcrum rod 30 and limit the extent of such pivotal movement. The threaded engagement of the portion 33 at the opening 39 also provides for limited relative vertical movement of the blocks 10 and 11 as permitted by the bails 24 and 25.

The blocks 10 and 11 have extending rearwardly therefrom levers 43, secured thereto by studs 44 for pivotal movement of the blocks 10 and 11 about the fulcrum provided by the fulcrum rod 30.

The block 10, forwardly of the fulcrum rod 30 has a downwardly extending slot 45 with an upper portion 46 extending downwardly from the upper face 12 to an inclined shoulder 47 and a lower extension 48 merging with the flat inner face 17 of the block 10 just below the midportion thereof.

The block 11 has a cooperating slot 50 with a lower portion 51 extending upwardly from the bottom face 19 to an inclined shoulder 52 and an upper extension 53 inclined towards the face 18 but with a slight clearance as at 54 to accommodate the tubing T.

It will be seen that by shifting the relative vertical positions of the blocks 10 and 11, and varying the position of the shoulders 47 and 52 and the shape of the opening provided by the slots 45 and 50, the tubing T can be tightly squeezed to close off the flow by flattening the tubing T (see FIG. 5) or slightly opened as shown in FIG. 4, or opened still further as shown in FIG. 6. The bails 24 and 25 by the pivotal reception of their ends 26 permit the shifting of the blocks 10 and 11 as described.

It will be noted that by pressing the levers 43 the blocks 10 and 11 can be swung about the fulcrum provided by the fulcrum rod 30 so that the valve can be mounted on the plastic tubing T at the slots 45 and 50 for use. The bails 24 and 25 permit such separation and close the blocks 10 and 11 to their positions for further adjustment.

With the blocks 10 and 11 held in the hand the thumb and first finger of the hand of the user can then grip the knurled surface 36 of the upper stem 35 to turn the fulcrum rod 30. By relative vertical positioning of the shoulders 47 and 52, the flow through the tubing T can be easily adjusted and the flow will remain constant at the selected low level. As indicated above a very low but controlled rate of flow of liquid in the tubing T can be obtained and maintained, and the rate can be changed at any time as desired.

I claim:

1. A valve for controlling the flow through a flexible tube comprising a first body block, a second body block pivotally and slidably mounted with respect to said first body block, said blocks having longitudinal facing surfaces separate for access therebetween, said facing surfaces having longitudinally disposed facing slots for the reception of the flexible tube, said slots between their ends being of varying depths, said blocks upon relative slidable shifting longitudinally of the slots varying the combined cross section of said slots, and the relative longitudinal positioning of said slots determining the flow through said tube.

2. A valve for controlling the flow through a flexible tube comprising a first body block, a second body block, said blocks having longitudinal facing surfaces separable for access therebetween, members for pivotally and longitudinally slidably mounting said blocks with respect to each other, said facing surfaces having facing longitudinally disposed slots for the reception of the flexible tube, said slots having interior tube engaging portions of varying depths between the ends of the slots whereby the combined cross sectional area of the slots and of the tube therein is varied between the ends of the slots upon relative longitudinal movement of said blocks thereby determining the flow through said tube.

3. A valve for controlling the flow through a flexible tube comprising a first body block, a second body block, said blocks having longitudinal facing surfaces separable for access therebetween, members for pivotally and longitudinally slidably connecting said blocks, said members having portions for changing the relative longitudinal positions of said facing surfaces, said facing surfaces having facing longitudinally disposed slots for the reception of the flexible tube, said slots between their ends being of varying cross sectional area whereby the combined cross sectional area of the slots and the tube therein is varied between the ends of the slots upon relative longitudinal movement of said blocks thereby determining the flow through said tube.

4. A valve for controlling the flow through a flexible tube comprising a first body block, a second body block, said blocks having longitudinally disposed facing surfaces, a longitudinal fulcrum rod between said blocks about which said blocks are laterally swingable for separation of said faces, said rod having a threaded portion, one of said blocks having a threaded portion in engagement with the threaded portion of said rod and mounted thereon for longitudinal movement relative to said rod, the other block having non-threaded engagement with said rod and mounted thereon against longitudinal movement relative to said rod, resilient bail members having terminal ends in pivotal engagement with said blocks urging said facing surfaces towards each other, said facing surfaces having oppositely disposed longitudinally extending facing slots for the reception of said tube, said slots being of varying depths between their ends and providing together between their ends a variable cross sectional area of the slots and of the tube, the relative longitudinal positioning of said slots determining the flow through said tube.

5. A valve as defined in claim 4 in which said fulcrum rod has a stem portion for manual adjustment.

6. A valve as defined in claim 4 in which said slots have shoulders therein.

7. A valve as defined in claim 4 in which said slots have portions inclined with respect to said facing surfaces.

8. A valve as defined in claim 4 in which said bail members between said terminal ends are substantially U-shaped.

9. A valve as defined in claim 4 in which said body blocks have operating levers extending therefrom for lateral swinging of said blocks.

10. A valve as defined in claim 4 in which the longitudinal facing surfaces of said body blocks are disposed on one side of said fulcrum rod and said body blocks on the other side of said fulcrum rod have operating levers extending therefrom for lateral swinging of said blocks.

References Cited by the Examiner

UNITED STATES PATENTS

| 2,112,592 | 3/38 | MacClatchie | 251—4 |
| 2,969,064 | 1/61 | Metz | 251—9 XR |
| 3,102,710 | 9/63 | Dresden | 251—9 |

FOREIGN PATENTS

| 2,658 | 1890 | Great Britain. |
| 13,127 | 1890 | Great Britain. |

ISADOR WEIL, *Primary Examiner.*

UNITED STATES PATENT OFFICE
CERTIFICATE OF CORRECTION

Patent No. 3,206,157                          September 14, 1965

Charles R. Reading

It is hereby certified that error appears in the above numbered patent requiring correction and that the said Letters Patent should read as corrected below.

Column 3, line 20, for "separate" read -- separable --.

Signed and sealed this 15th day of March 1966.

(SEAL)
Attest:

ERNEST W. SWIDER                          EDWARD J. BRENNER
Attesting Officer                              Commissioner of Patents